Sept. 8, 1970  G. R. COOK ET AL  3,527,252
TUBE SWITCHING DEVICE
Filed April 23, 1968  3 Sheets-Sheet 1

INVENTORS
GEORGE R. COOK
MARLOWE A. HAIN

BY *Albert J. Kramer*
ATTORNEY

Sept. 8, 1970        G. R. COOK ET AL        3,527,252
TUBE SWITCHING DEVICE
Filed April 23, 1968                              3 Sheets-Sheet 2
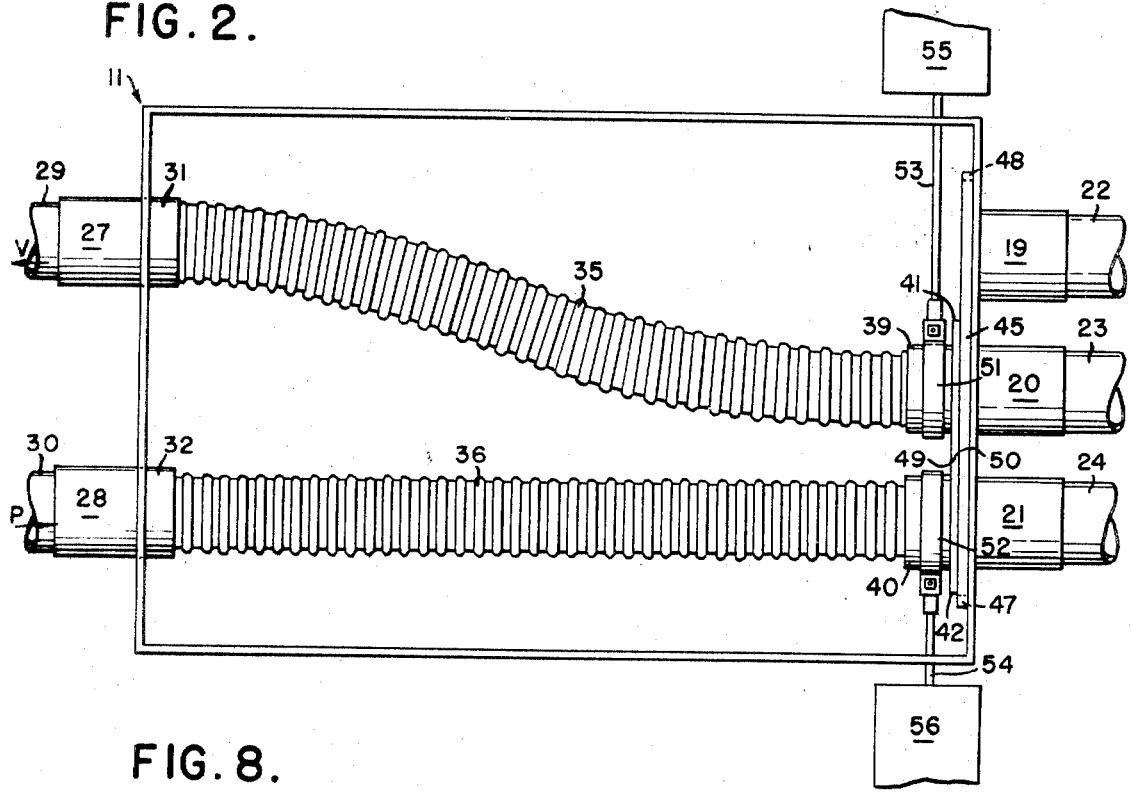
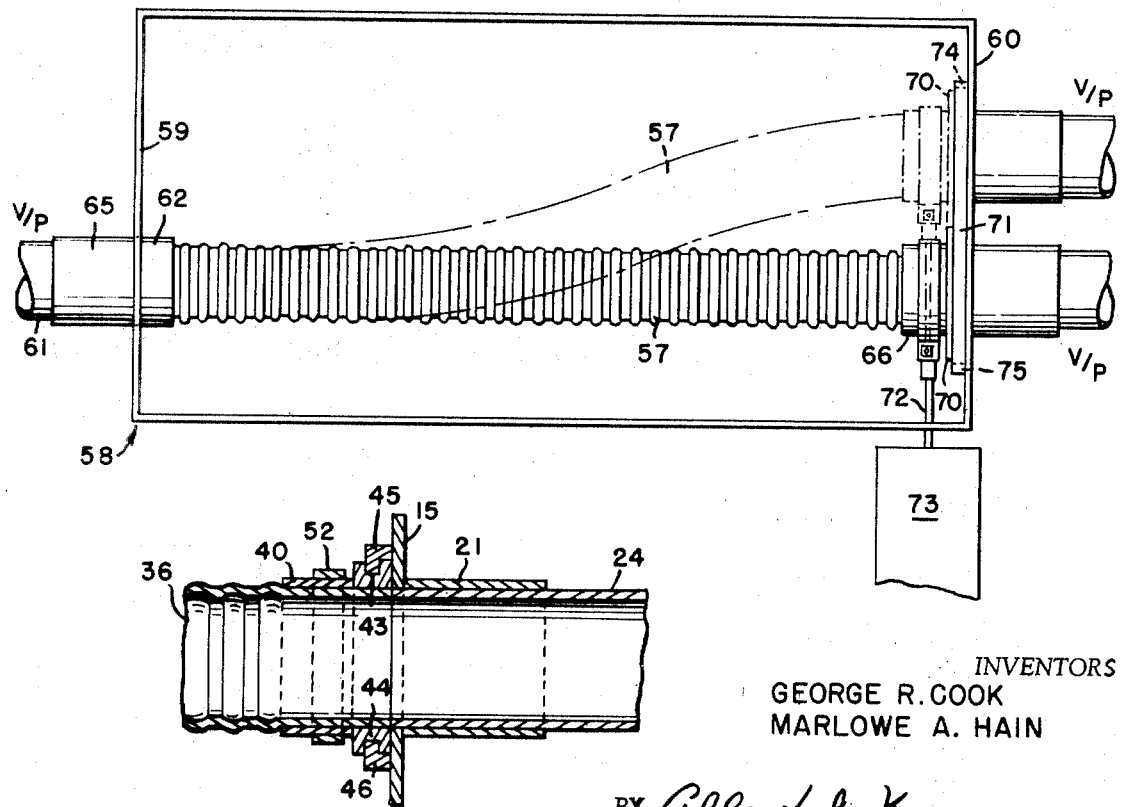
INVENTORS
GEORGE R. COOK
MARLOWE A. HAIN
BY Albert J. Kramer
ATTORNEY Sept. 8, 1970     G. R. COOK ET AL     3,527,252
TUBE SWITCHING DEVICE Filed April 23, 1968     3 Sheets-Sheet 3

INVENTORS
GEORGE R. COOK
MARLOWE A. HAIN

BY *Albert J. Kramer*

ATTORNEY

United States Patent Office 3,527,252
Patented Sept. 8, 1970

3,527,252
TUBE SWITCHING DEVICE
George Richard Cook and Marlowe A. Hain, Rochester, N.Y., assignors to Cutler Mail Chute Company, Inc., Rochester, N.Y., a corporation of New York
Filed Apr. 23, 1968, Ser. No. 723,544
Int. Cl. F17d 1/00
U.S. Cl. 137—608    11 Claims

ABSTRACT OF THE DISCLOSURE

A tube switching device is provided between two tube sytems, one having a greater number of tubes than the other. The device comprises a flexible tube, such as of polyvinyl chloride resin connected between the two systems. One end of the flexible tube is mounted on a shiftable plate which permits changing its position relative to the open ends of tubes on the adjacent tube system to selectively establish continuity with any of said open end tubes. Flow through the tubes may be in either direction under pressure and/or vacuum. The plate may be shifted manually or by any conventional means, including pneumatic, hydraulic, electromagnetic, mechanical, or any other suitable means.

---

This invention relates to tube systems and it is more particularly concerned with hollow tubes used to transmit materials between stations.

An object of this invention is the provision of switching means for quickly changing the relationship of tubes comprising a tube system to alter the system to a different condition.

A further object is the provision of a given arrangement of tubes having moveable tube sections with means for moving the sections to provide a modified flow of fluid therethrough.

A still further object is the provision of a tube arrangement of the type mentioned in which the modifications can be effected quickly by different conventional means.

A still further object is the provision of a tube arrangement of the type mentioned especially adapted to pneumatic operations but which is also applicable to fluids generally.

These and still further objects, advantages and features of the invention will appear more fully from the following description considered together with the accompanying drawing.

In the drawing:

FIG. 2 is a view similar to FIG. 1 with one of the tube sections moved to a central position.

FIG. 5 is a section along the line 5—5 of FIG. 1.

FIG. 8 is a view similar to FIG. 1 of a modified embodiment of the invention.

Figure 1:
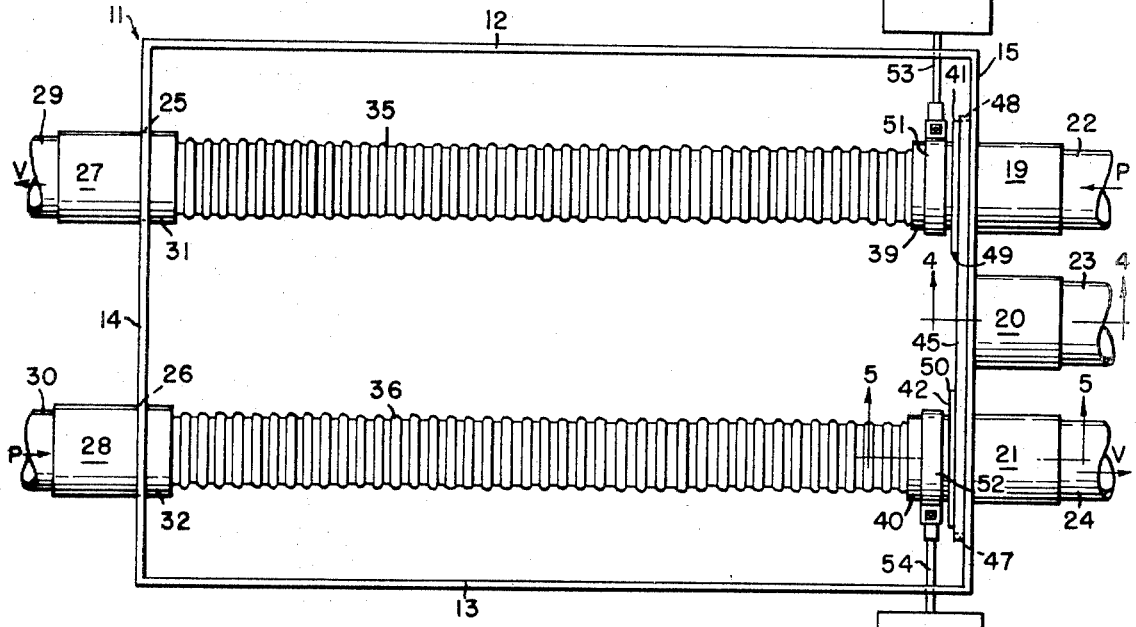
FIG. 1 is a schematic plan view of a tube switching means in accordance with an embodiment of this invention.

Referring with more particularity to the drawing, in which like numerals designate like parts, the embodiment illustrated in FIG. 1 comprises a frame 11 having side walls 12 and 13 and end walls 14 and 15.

End wall 15 is provided with three apertures 16, 17 and 18. Each aperture is provided with a tubular collar 19, 20 and 21, to the interior of which tubes 22, 23 and 24, respectively, of a tube system are secured, such as by gluing, welding, or any other conventional means.

The opposite end wall 14 is provided with two apertures 25 and 26, generally aligned with the apertures 16 and 18. Outer tubular collars 27 and 28 are secured to the end wall 14 adjacent the apertures 25 and 26 to the interior of which tubes 29 and 30 of the tube system are similarly secured. The apertures 25 and 26 are also provided with inner tubular collars 31 and 32 to the interior of which the ends of flexible tubes 35 and 36, respectively, are similarly secured.

The tubes 35 and 36 may be made of helically wound plastic material, such as of polyvinyl chloride resin, or of rubber, aluminum or any other suitable material which can be flexed and stretched to the degree required, as will appear hereinafter.

The opposite ends of the tubes 35 and 36 are connected to the interior of collars 39 and 40, respectively. The collars 39 and 40 are mounted on slide plates 41 and 42, which have openings 43 and 44 therethrough. The slide plates 41 and 42 have grooves 43 and 44 at the top and bottom, respectively, to slidably engage inwardly facing track flanges 45 and 46 secured to the inner face of the wall 15.

Figure 3:
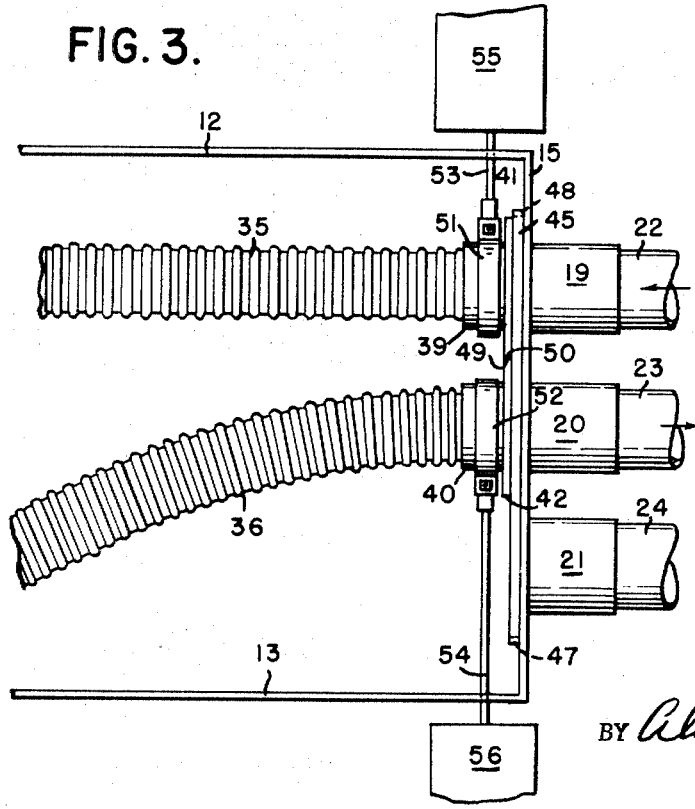
FIG. 3 is a view similar to FIG. 1 with the other tube section moved to a central position.
Figure 4:
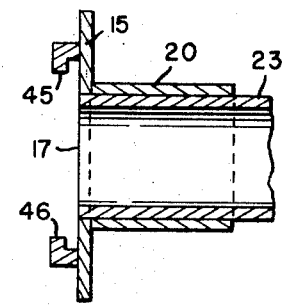
FIG. 4 is a section along the line 4—4 of FIG. 1.
Figure 6:
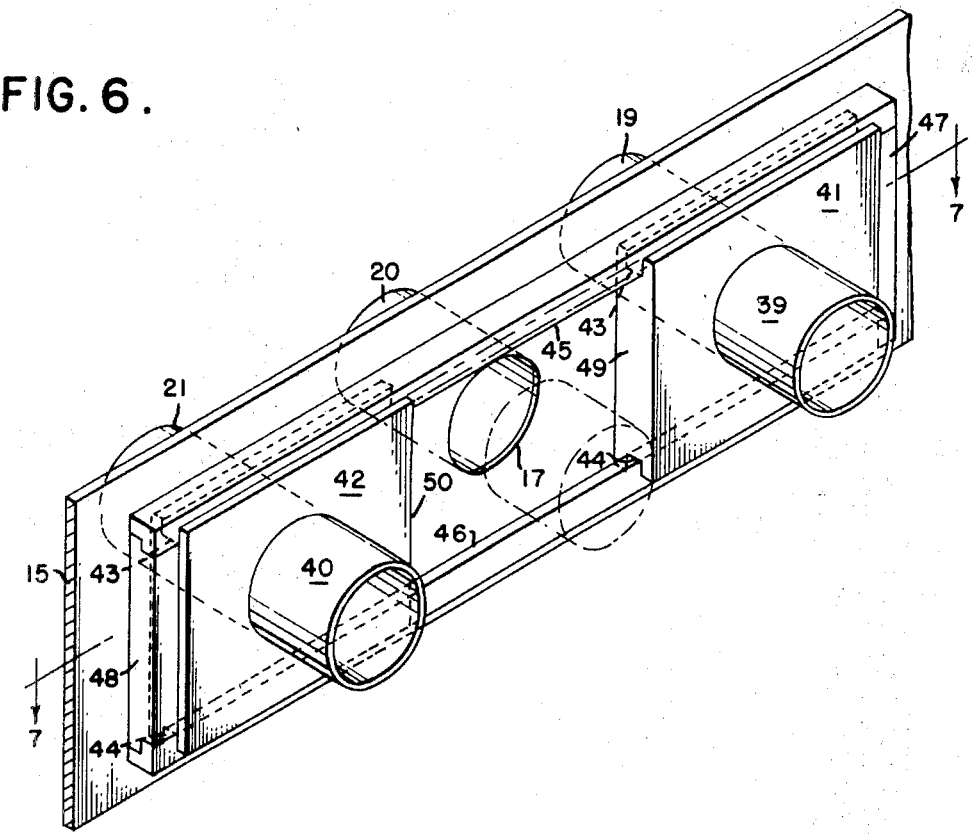
FIG. 6 is a perspective view of the right end wall of FIG. 1, apart from the tubes and connecting rods.
Figure 7:
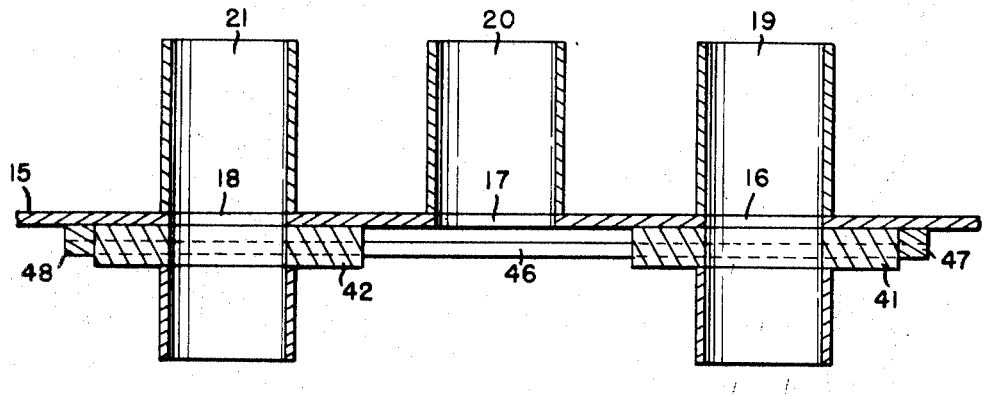
FIG. 7 is a section along the line 7—7 of FIG. 6.

The track flanges 45 and 46 are provided with abutments 47 and 48 at either end for limiting the slide plates 41 and 42 to their outermost positions. The inner position of either plate is limited by abutment of its inner end against the inner end of the other plate, such as the inner end 49 of plate 41 and the inner end 50 of plate 42. See FIGS. 2 and 3.

The collars 39 and 40 are connected each to a clamp 51 and 52 which clamps are each connected to one end of a connecting rod 53 and 54, respectively. The other ends of the connecting rods are each connected to a drive 55, 56 of any conventional type, such as pneumatic, hydraulic, electromagnetic, or mechanical, to reciprocate the rods under conventional controls (not shown). The rods may, alternatively, also be reciprocated manually.

The operation of the invention is as follows: The normal position of the embodiment described is as shown in FIG. 1 with fluid flowing in one direction from tube 22 through flexible tube 35 to tube 29, for example. Also, fluid may flow in the opposite direction from tube 30 through flexible tube 36 to tube 24. Positive pressure is applied to tubes 22 and 30; negative pressure or vacuum is applied to tubes 24 and 29.

In this normal position, material may be passed from a first station in one direction through tubes 22, 35 and 29 to a remote station, and in the opposite direction through tubes 30, 36 and 24.

By sliding the plate 42 inwardly in a position of alignment of tube 36 with the aperture 17 (see FIG. 3), a diversion is effected from the first station to a different remote station connected to the tube 23 under pressure in the tube 30.

Alternatively, by sliding the plate 41 inwardly to a position of alignment of the tube 35 with the aperture 17 (see FIG. 2), a flow is effected of fluid from the remote station to which the tube 23 is connected, to the tube 29 under the negative pressure or vacuum in the tube 23.

Thus, it is possible by means of this embodiment to select three different systems of operation involving five stations.

The embodiment illustrated in FIG. 8 is similar to the embodiment described above, except that it contains only one flexible and stretchable tube 57 in a similar rectangular frame 58, having end walls 59 and 60. The end wall 59 has only one permanent tube 61 connected to collar 65. The tube 57 is connected at one end to a collar 62 adjacent collar 65 and at the other end to a collar 66 connected on a slide plate 70 slidably mounted on a track 71 in a manner similar to that of the previous embodiment described. A similar connecting rod 72 is provided and connected with clamp 67 to collar 67. Similar means 73 for reciprocating the rod 72 is provided. Abutments 74 and 75 are provided at either end of the track for limiting the movement of the slide plate 70.

The tube 61 may be subjected to either pressure or vacuum while the tube 63 is correspondingly subjected to vacuum or pressure, depending upon the direction of flow desired. By shifting the plate between tubes 63 and 64, flow may be effected selectively to or from a single station connected to tube 61, from or to stations to which tubes 63 and 64 are connected.

What is claimed is:

1. A tube switching device between a first tube system having a lesser number of tubes and a second tube system having a greater number of tubes, the tubes of the second system having open ends, said device comprising a one piece flexible and stretchable tube connected to one end of a tube of the first system, one end of the flexible and stretchable tube being open and shiftable, means for constraining said shiftable end in a path abutting the open ends of the tubes of said second system, a reciprocating drive mechanism, rigid means connecting said mechanism to the said shiftable end for selectively shifting said shiftable end from abutment with the open end of one tube to abutment with the open end of another tube of the second tube system, whereby a closure is selectively effected between the open end of the flexible and stretchable tube and each of the open ends of the tubes of the second tube system.

2. A tube switching device as defined by claim 1 in which the first tube system comprises at least one tube and the second tube system comprises at least two tubes.

3. A tube switching device as defined by claim 1 in which the first tube system comprises two tubes, the second tube system comprises three tubes and in which the two tubes of the first system are pressurized and vacuumized, respectively, and two corresponding tubes of the second system are respectively vacuumized and pressurized.

4. A tube switching device as defined by claim 1 in which the means also comprises a slide plate having parallel grooves on opposite sides, stationary flanges slidably engaging said grooves and serving to slidably hold the said other end of the flexible tube and plate is fixed longitudinal position.

5. A tube switching device as defined by claim 1 and a housing for the flexible and stretchable tube, said housing comprising opposite end walls, said first tube system being connected to one end wall and the other tube system being connected to the other end wall.

6. A tube switching device as defined by claim 1 in which the means comprises a slidable plate, a collar carried by the plate, the other end of the flexible and stretchable tube being connected to the collar.

7. A tube switching device as defined by claim 6 in which the plate is provided with track grooves and a track slidably engaging said grooves, secured in juxtaposition to said second tube system.

8. A tube switching device as defined by claim 4, and means for slidably supporting the plate.

9. A tube switching device as defined by claim 8, and abutment means for limiting the slidable movement of the plate to selected positions relative to the second tube system.

10. A tube switching device as defined by claim 1 in which the flexible and stretchable tube is formed of a helically wound material.

11. A tube switching device as defined by claim 10 in which the helically wound tube is of polyvinyl chloride resin.

References Cited

UNITED STATES PATENTS

| | | | |
|---|---|---|---|
| 2,586,144 | 2/1952 | Benoit | 137—610 XR |
| 2,728,356 | 12/1955 | Brinsmade et al. | 138—121 |
| 2,831,651 | 4/1958 | Hutchings | 137—610 XR |
| 3,089,515 | 5/1963 | Bochan | 137—610 |
| 3,132,669 | 5/1964 | Feldsted | 137—610 XR |
| 3,157,543 | 11/1964 | Roberts et al. | 138—122 XR |
| 3,174,806 | 3/1965 | Barber et al. | 137—610 XR |
| 3,324,895 | 6/1967 | Johnson | 138—121 |
| 3,395,731 | 8/1968 | Kauffman | 137—610 |

SAMUEL SCOTT, Primary Examiner